United States Patent
Bell et al.

(10) Patent No.: US 8,329,268 B2
(45) Date of Patent: Dec. 11, 2012

(54) PAPER-BASED PLANT POT, AND BLANK FOR MAKING SAME

(75) Inventors: Susan Bell, Fort Mill, SC (US); Wim van De Camp, Meerssen (NL); William David Decker, Hartsville, SC (US); Bruce A. Moon, Hartsville, SC (US); David E. Rhodes, Hartsville, SC (US); Tony Rummage, Hartsville, SC (US); John Whitehead, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 344 days.

(21) Appl. No.: 12/632,212

(22) Filed: Dec. 7, 2009

(65) Prior Publication Data

US 2011/0135856 A1 Jun. 9, 2011

(51) Int. Cl.
*B32B 27/10* (2006.01)
*B32B 23/06* (2006.01)
*B65D 5/16* (2006.01)
*B65D 5/10* (2006.01)

(52) U.S. Cl. ....... 428/34.2; 428/192; 229/119; 229/128; 229/185

(58) Field of Classification Search .................. 206/423; 229/400, 5.5, 4.5, 119, 128, 185; 428/34.2, 428/192; 47/66.3
See application file for complete search history.

(56) References Cited

U.S. PATENT DOCUMENTS

| | | | |
|---|---|---|---|
| 448,143 A * | 3/1891 | Piper et al. | 229/4.5 |
| 1,006,722 A | 10/1911 | Claussen et al. | |
| 1,206,708 A | 11/1916 | Hutchins | |
| 1,713,720 A | 5/1929 | Simmons | |
| 1,870,223 A | 8/1932 | Barbieri | |
| 2,014,477 A | 9/1935 | Lee | |
| 2,134,321 A | 10/1938 | Amberg | |
| 2,140,932 A | 12/1938 | Avery | |
| 2,240,599 A | 5/1941 | Amberg | |

(Continued)

FOREIGN PATENT DOCUMENTS

CA 2 336 898 A1 1/2000

(Continued)

OTHER PUBLICATIONS

"Paper and Paperboard Packaging Technology," Published by Blackwell Publishing, Jun. 7, 2007, edited by Kirwan, Mark J.*

(Continued)

*Primary Examiner* — Rena Dye
*Assistant Examiner* — Susan R Dye
(74) *Attorney, Agent, or Firm* — Alston & Bird LLP

(57) ABSTRACT

A paper-based plant pot comprises a container formed from a sheet of paper-based material wrapped about an axis, opposite edge portions of the sheet being secured to each other, the container having a side wall that encircles the axis and a bottom wall formed by a plurality of bottom panels of the sheet folded inwardly from a lower edge of the side wall and engaging one another. The sheet comprises a paperboard substrate formed of natural cellulose fibers, an internal sizing composition incorporated into the paperboard substrate so as to render the paperboard substrate substantially resistant to saturation by liquid water, and a thermoplastic polymer layer on one of the major surfaces of the paperboard substrate. The thermoplastic polymer layer faces an interior of the container and forms an inner surface thereof for contact with soil or other growing medium placed in the container.

9 Claims, 4 Drawing Sheets

U.S. PATENT DOCUMENTS

| | | | |
|---|---|---|---|
| 2,567,706 A | | 9/1951 | Hannum et al. |
| 2,737,332 A | | 3/1956 | Amberg et al. |
| 2,758,419 A | * | 8/1956 | Schmitz .......................... 47/73 |
| 3,331,155 A | | 7/1967 | Chancellor |
| 3,521,741 A | * | 7/1970 | Beaudry .................. 229/117.17 |
| 3,827,623 A | | 8/1974 | Arneson |
| 3,901,431 A | | 8/1975 | Carlson |
| 4,578,899 A | | 4/1986 | Katila et al. |
| 4,881,344 A | | 11/1989 | Frey et al. |
| 5,213,857 A | | 5/1993 | Erkkila |
| 5,213,858 A | | 5/1993 | Tanner et al. |
| 5,250,353 A | | 10/1993 | Bartholomew et al. |
| 5,335,449 A | | 8/1994 | Beatty |
| 5,672,434 A | | 9/1997 | Dalebroux et al. |
| 5,701,642 A | | 12/1997 | Order |
| 5,906,713 A | | 5/1999 | Yeh et al. |
| 6,286,252 B1 | | 9/2001 | O'Neal |
| 6,421,957 B1 | | 7/2002 | Hasegawa et al. |
| 6,593,276 B2 | | 7/2003 | Walley et al. |
| 6,903,053 B2 | | 6/2005 | Noda et al. |
| 2005/0188612 A1 | | 9/2005 | Theuer |
| 2006/0292197 A1 | | 12/2006 | Bennett et al. |
| 2007/0163172 A1 | | 7/2007 | Savich |
| 2008/0248284 A1 | * | 10/2008 | Williams et al. .............. 428/323 |

FOREIGN PATENT DOCUMENTS

| | | | |
|---|---|---|---|
| DE | 40 09 463 A1 | | 9/1991 |
| EP | 0 429 050 A1 | | 5/1991 |
| EP | 1 306 004 A2 | | 5/2003 |
| FR | 2 821 712 B1 | | 9/2002 |
| FR | 2 835 697 A1 | | 8/2003 |
| JP | 02286013 A | | 11/1990 |
| JP | 6-62944 A | | 3/1994 |
| JP | 2001-161173 A | | 6/2001 |
| JP | 2002-65073 A | | 3/2002 |
| JP | 2002101761 A | | 4/2002 |
| JP | 2003-182015 A | | 7/2003 |
| JP | 2003304751 A | | 10/2003 |
| JP | 2004-121054 A | | 4/2004 |
| WO | WO 94/03044 A1 | | 2/1994 |
| WO | WO 2007020250 A1 | * | 2/2007 |
| WO | WO 2009/062141 A2 | | 5/2009 |

OTHER PUBLICATIONS

International Search Report and Written Opinion for corresponding International Application No. PCT/US2010/055922, mailed Feb. 23, 2011.

* cited by examiner

SECTION A-A

PAPER-BASED PLANT POT, AND BLANK FOR MAKING SAME

BACKGROUND OF THE INVENTION

The present disclosure relates to pots for containing growing plants, and particularly relates to plant pots that can be buried in soil along with the growing plant, as opposed to having to remove the plant from the pot before transplanting the plant into the soil.

Plants that are raised for distribution in commerce are typically raised in a nursery or greenhouse until they are mature enough to be distributed to retail outlets. The vast majority of the time, molded plastic pots are used for raising the plants at the nursery. Consumers then purchase the plants in the pots and transplant the plants into soil at their home. The conventional plastic pots must be separated from the plants and discarded prior to planting the plants in the soil. The pots typically end up in landfills, where they remain for a very long time because they are not biodegradable.

BRIEF SUMMARY OF THE DISCLOSURE

The plant pot described in the present disclosure was developed as an alternative to such conventional plastic pots, a primary objective being to formulate the plant pot such that it will degrade relatively quickly when buried in soil. This allows the consumer to simply bury the pot with the plant in it, rather than having to remove the plant from the pot before planting.

At the same time, the pot must be able to remain intact as long as the pot is out of the ground, for a sufficient length of time (2 to 4 months) to allow the seedling plants to grow large enough to be planted. During this time in the nursery, the pot must be able to withstand watering each day (which can include partially submerging the pot in standing water) without losing integrity. The pot must also be able to maintain an attractive appearance even with such frequent and prolonged watering, or else consumers will tend to prefer the conventional plastic pots.

These contrary requirements of quick degradability when buried in soil on the one hand, and ability to remain intact and attractive when frequently wetted over a substantial period of time on the other hand, presented a serious challenge to the development of the plant pot described herein. Nevertheless, a plant pot has been developed that is expected to successfully meet these countervailing requirements.

The plant pot in accordance with one aspect of the present development comprises a paper-based plant pot. Many paper-based plant pots have been proposed or attempted by others, but none is known having the unique combination of features and characteristics of the present paper-based plant pot. Specifically, the paper-based plant pot comprises a container formed from a sheet of paper-based material wrapped about an axis, opposite edge portions of the sheet being secured to each other, the container having a side wall that encircles the axis and a bottom wall formed by a plurality of bottom panels of the sheet folded inwardly from a lower edge of the side wall and secured to one another to form the bottom wall. The sheet comprises (1) a paperboard substrate formed of natural cellulose fibers, the paperboard substrate having a thickness defined between opposite major surfaces thereof, (2) an internal sizing composition incorporated into the paperboard substrate so as to render the paperboard substrate substantially resistant to saturation by liquid water, and (3) a thermoplastic polymer layer on one of the major surfaces of the paperboard substrate. The sheet is oriented such that the thermoplastic polymer layer faces an interior of the container and forms an inner surface thereof for contact with soil or other growing medium placed in the container.

The sheet can also comprise an antifungal material for resisting formation of fungus on the sheet.

Advantageously the paperboard substrate comprises recycled papermaking fibers.

The internal sizing composition can comprise, for example, alkyl ketene dimer (AKD) added to the papermaking furnish at a concentration of about 10 to 50 pounds per ton of dry furnish, more preferably about 20 to 40 pounds per ton, and most preferably about 30 to 40 pounds per ton. Alternatively, other sizing compositions, such as alkenyl succinic anhydride (ASA), could be used.

The thermoplastic polymer can comprise a polyolefin such as polyethylene, and optionally can include a biodegradation-enhancing additive. For example, the additive can comprise a prodegradant additive such as used in so-called oxo-biodegradable (OBD) plastics. The prodegradant is a metal salt that catalyzes the oxidation of the polyolefin so as to scissor the long polymer chains into shorter chain molecules that are then available for biomineralization by microorganisms such as bacteria and fungi.

Based on preliminary testing, it is expected that the paper-based plant pot can maintain integrity even with frequent (daily) wetting for a prolonged period of time (2 to 4 months), and even when the outer surface of the paperboard substrate does not have any water-resistant coating. At the same time, based on the preliminary testing, it is expected that the pot will degrade relatively quickly when buried in soil.

The present disclosure also describes a blank for constructing a paper-based plant pot. The blank comprises a sheet made up of a paperboard substrate formed of natural cellulose fibers, an internal sizing composition incorporated into the paperboard substrate so as to render the paperboard substrate substantially resistant to saturation by liquid water, and a thermoplastic polymer layer on one of the major surfaces of the paperboard substrate. The sheet comprises a side wall panel having a top edge and an opposite bottom edge, and a plurality of bottom panels integrally formed with the side wall panel and extending from the bottom edge thereof, the side wall panel forming a side wall of a container when the sheet is wrapped about an axis, the bottom panels being foldable inwardly such that the bottom panels engage one another to form a bottom wall of the container.

In one embodiment, the plant pot is formed as a "single-wrap" type of container wherein the sheet is wrapped about an axis and opposite edge portions of the sheet form an unfolded lap joint therebetween. The edge portions can be secured together by heat sealing of the thermoplastic polymer layer on one of the edge portions to the paperboard substrate of the other edge portion.

In one embodiment, each of the bottom panels has a proximal end integrally connected to the bottom edge of the side wall panel, an opposite distal end that defines a free edge, and a pair of opposite side edges extending between the proximal and distal ends. Each of the bottom panels is folded inwardly about a fold line defined at a juncture between the proximal end of the bottom panel and the bottom edge of the side wall panel. The side edges of adjacent ones of the bottom panels are spaced apart when the sheet is flat prior to wrapping about the axis, and overlap each other when the sheet is wrapped about the axis and the bottom panels are folded inwardly.

In one embodiment, the bottom wall of the container defines a central hole therethrough, the central hole being defined as a space between the distal ends of the bottom panels. The container can also define a plurality of spaced-apart holes located at a juncture between the side wall and the bottom wall.

The bottom wall of the container can be recessed such that a center of the bottom wall is at a higher vertical level than the juncture between the side wall and the bottom wall.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
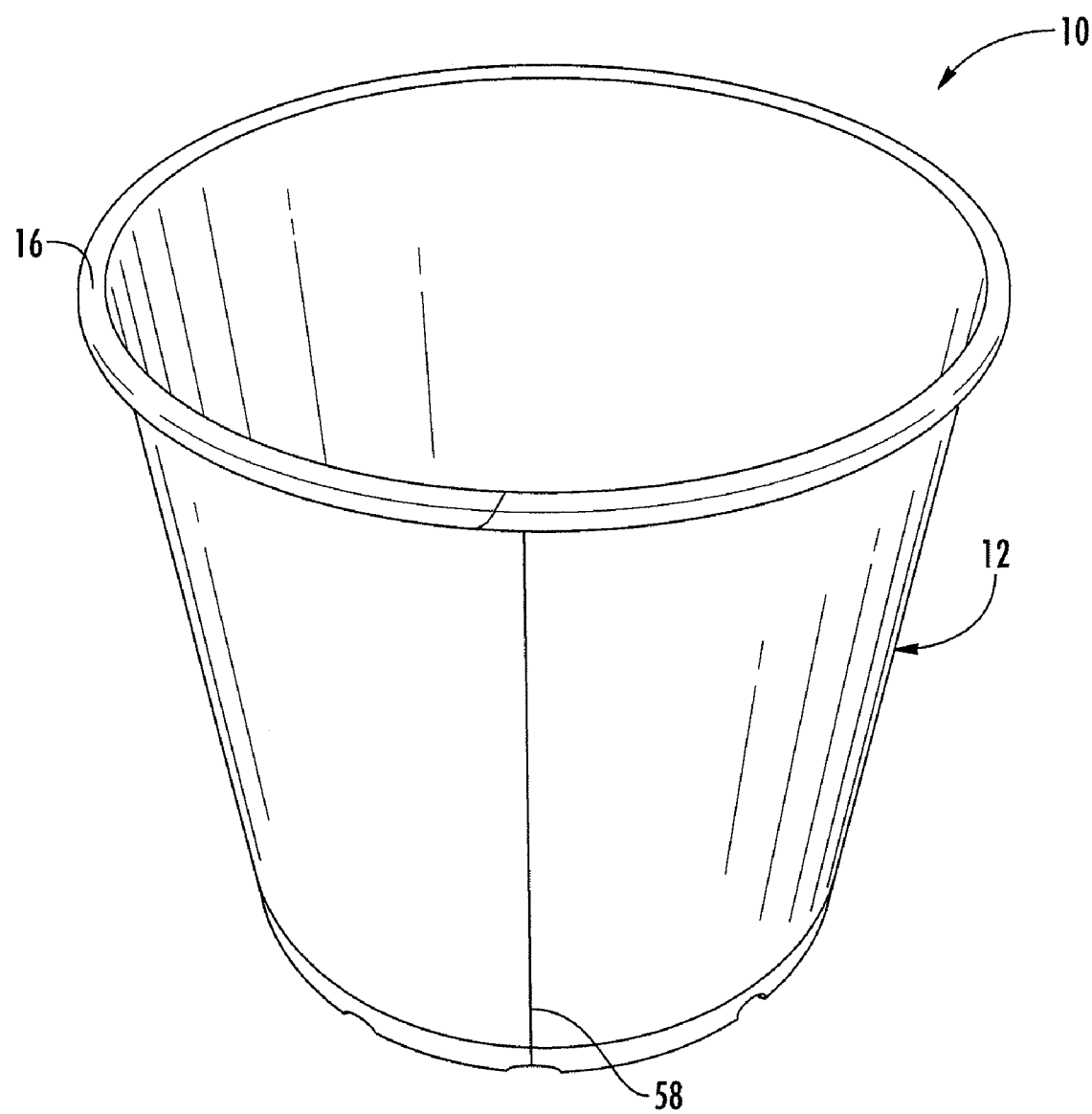
FIG. 1 is a perspective view of a plant pot in accordance with one embodiment of the invention.
Figure 2:
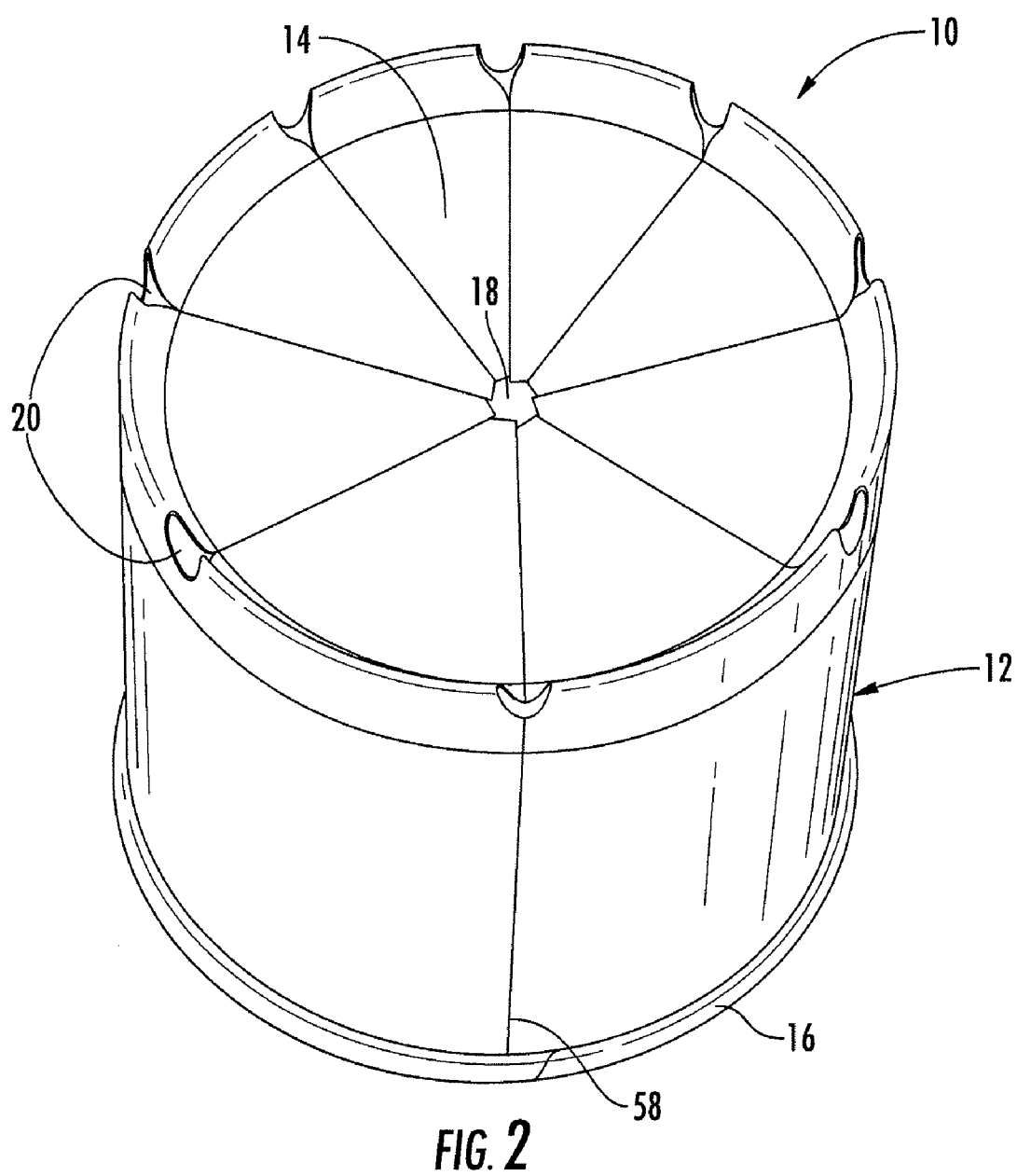
FIG. 2 is perspective view of the plant pot viewed generally from below.
Figure 3:
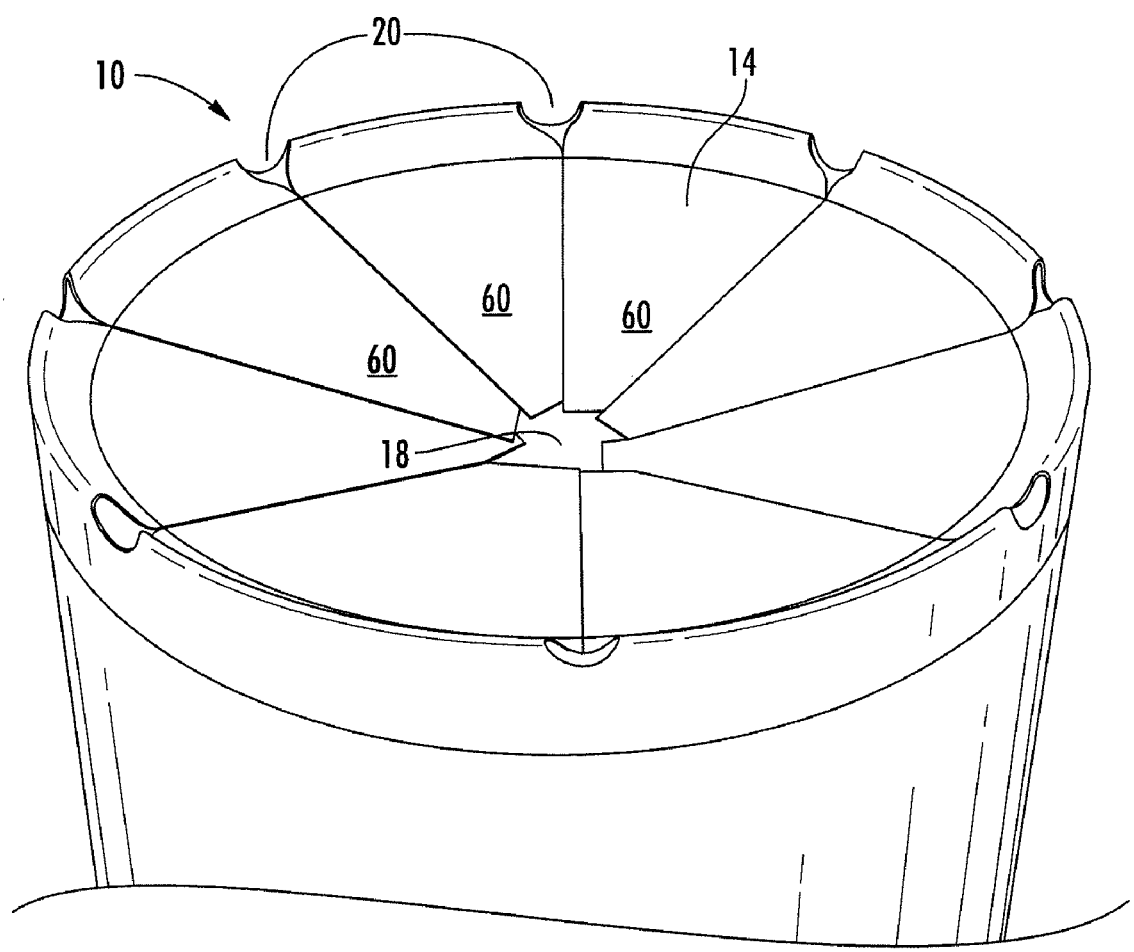
FIG. 3 is another perspective view of the plant pot viewed generally from below.

A plant pot 10 in accordance with one embodiment of the present invention is depicted in FIGS. 1-3. The pot 10 is constructed from a blank 40 depicted in FIG. 4. The pot is formed by wrapping the blank 40 about an axis and securing opposite edges of the blank together, and folding portions of the blank to form a bottom for the pot, as further described below. The pot includes a side wall 12 and a bottom wall 14. The side wall 12 advantageously is conical in configuration so that empty pots 10 can be nested during shipping and storage. A rolled rim 16 can be formed at the top edge of the side wall 12 for added rigidity if desired. The bottom wall 14 has a central hole 18 through it, and the pot has additional holes 20 located at the juncture of the side wall 12 and the bottom wall 14.

Figure 4:
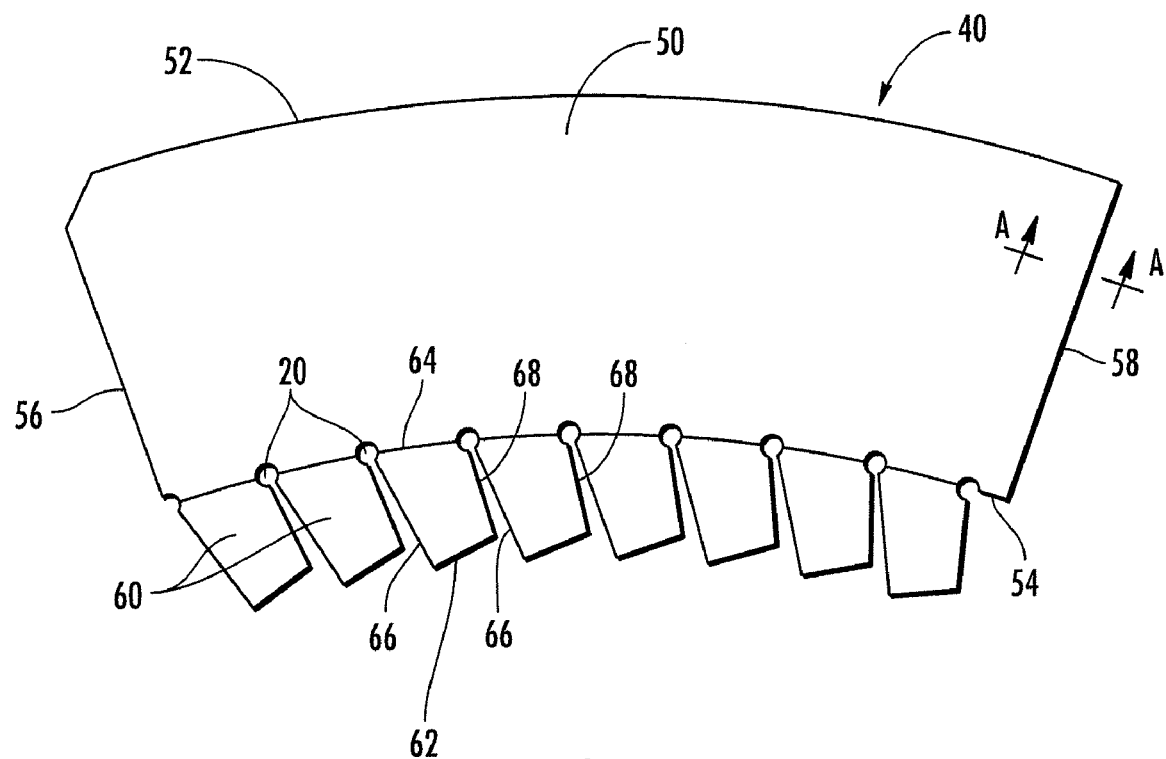
FIG. 4 is plan view of a flat blank from which the plant pot of FIG. 1 is constructed.
Figure 5:
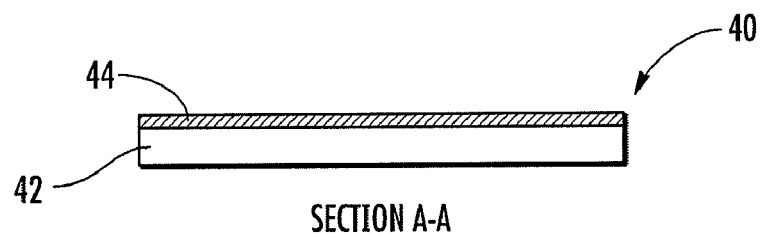
FIG. 5 is a cross-sectional view along Section A-A as indicated in FIG. 4.

With reference to FIG. 4 showing the blank 40, and FIG. 5 showing a cross-sectional view through the blank, the blank comprises a sheet of flexible material. The sheet comprises a paperboard substrate 42 formed of natural cellulose fibers and having an internal sizing composition incorporated into the paperboard substrate so as to render the paperboard substrate substantially resistant to saturation by liquid water, and a thermoplastic polymer layer 44 on one of the major surfaces of the paperboard substrate. The other major surface of the paperboard substrate can be free of any polymer layer, as shown in FIG. 5. The paperboard substrate 42 can be made from recycled papermaking fibers. The internal sizing composition can comprise, for example, alkyl ketene dimer (AKD) added to the papermaking furnish at a concentration of about 10 to 50 pounds per ton of dry furnish, more preferably about 20 to 40 pounds per ton, and most preferably about 30 to 40 pounds per ton. Alternatively, other sizing compositions, such as alkenyl succinic anhydride (ASA), could be used.

The thermoplastic polymer making up the layer 44 can comprise a polyolefin such as polyethylene, and optionally can include a biodegradation-enhancing additive. For example, the additive can comprise a prodegradant additive such as used in so-called oxo-biodegradable (OBD) plastics. The prodegradant is a metal salt that catalyzes the oxidation of the polyolefin so as to scissor the long polymer chains into shorter chain molecules that are then available for biomineralization by microorganisms such as bacteria and fungi.

The sheet is die cut to form the blank 40. The blank includes a side wall panel 50 having a top edge 52, a bottom edge 54, a first side edge 56, and a second side edge 58, and a plurality of bottom panels 60 that are integrally formed with the side wall panel 50 and extend from the bottom edge 54. Each bottom wall panel 60 includes a distal end that defines a free edge 62, a proximal end joined to the bottom edge of the side wall panel 50 along a fold line 64, and a pair of opposite side edges 66 and 68 that extend between the proximal and distal ends. The bottom panels 60 are separate and distinct from one another; thus, the side edge 66 of one bottom panel is spaced from the side edge 68 of an adjacent bottom panel.

The side wall panel 50 has an arcuate shape in plan view, such that the top and bottom edges 52, 54 are substantially circular arcs, and the side edges 56, 58 are substantially radial with respect to those circular arcs. The bottom panels 60 have their lengthwise axes oriented non-radially with respect to the edges 52, 54.

The blank 40 is formed into a pot 10 by wrapping the side wall panel 50 of the blank about an axis until an edge portion of the blank adjacent the side edge 56 overlaps an edge portion of the blank adjacent the opposite side edge 58, with the polymer layer 44 on one of those edge portions in contact with the paperboard substrate 42 of the other edge portion, thus forming a straight lap joint, and heating the lap joint to melt the polymer layer 44 on the one edge portion so that it adheres to the paperboard substrate of the other edge portion, thereby securing the edge portions together. The bottom panels 60 are folded inwardly about the fold lines 64 and overlap one another in a petal fashion such that the polymer layer 44 of one bottom panel is in contact with the paperboard substrate 42 of an adjacent bottom panel, and the bottom panels are heat-sealed together via the polymer layer 44, similar to how the edge portions of the side wall panel are heat-sealed together.

The blank 40 defines a series of holes 20 located at the bottom edge 54 of the side wall panel. Each hole 20 (except for the endmost holes) is located between the proximal ends of two adjacent bottom panels 60, and is formed partly in the side wall panel 50 and partly in the two adjacent bottom panels 60. Accordingly, when the blank is wrapped and formed into a pot as described in the preceding paragraph, the resulting pot has holes 20 located at the juncture between the side wall 12 and the bottom wall 14, as best seen in FIG. 3.

The bottom wall 14 of the pot, formed by the overlapping bottom panels 60, advantageously is recessed as best seen in FIG. 3. The center of the bottom wall thus is at a higher vertical level than the juncture between the side wall 12 and the bottom wall 14, which juncture defines an outer rim on which the pot rests. The recessed bottom wall may help resist sagging of the bottom wall.

As noted, the bottom wall 14 defines a central hole 18 that results from the fact that the bottom panels 60 are not long enough to have the distal ends of two diametrically opposite bottom panels meet. The hole 18 and the holes 20 allow water drainage from the pot while the pot is in the nursery or in a retail outlet, and also allow the plant's roots to grow through them after the pot is buried in soil.

The blank 40 is wrapped and formed into the pot 10 such that the polymer layer 44 of the blank faces the interior of the pot and thus is adjacent to the soil or other growing medium contained in the pot. The polymer layer thus not only serves to heat seal the lap joints when the blank is wrapped and folded to form the pot, but also serves as a moisture barrier between the moist soil in the pot and the paperboard substrate 42 of the blank.

The blank 40 can include an antifungal material to resist formation of mold or fungus on the pot while it is in the nursery or in a retail outlet. The antifungal material can be incorporated into the paperboard substrate 42 during the papermaking process, or can be applied to the paperboard substrate after its formation.

Optionally, the plant pot 10 can include additional features to resist wetting of the paperboard during the time the pot is kept in a greenhouse or the like. For example, one optional feature is a water-resistant coating (e.g., paraffin or other wax) applied to the exterior bottom portion of the pot to help resist wetting when the pot sits in a puddle of water on a greenhouse bench or the like for a prolonged period of time.

Another optional feature is a water-resistant coating applied to substantially the entire exterior surface of the pot. The coating can be a water-based composition such as an aqueous emulsion of a polymer (e.g., polypropylene, acrylic, etc.). An antifungal agent can be incorporated into the water-based composition for added resistance to mold and fungus.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A paper-based plant pot comprising:
   a container formed from a sheet of paper-based material wrapped about an axis, opposite edge portions of the sheet being secured to each other, the container having a side wall that encircles the axis and a bottom wall formed by a plurality of bottom panels of the sheet folded inwardly from a lower edge of the side wall and secured to one another to form the bottom wall, wherein the sheet comprises:
   a paperboard substrate formed of natural cellulose fibers, the paperboard substrate having a thickness defined between opposite major surfaces thereof;
   an internal sizing composition incorporated into the paperboard substrate so as to render the paperboard substrate substantially resistant to saturation by liquid water; and
   a thermoplastic polymer layer on one of the major surfaces of the paperboard substrate;
   the sheet being oriented such that the thermoplastic polymer layer faces an interior of the container and forms an inner surface thereof for contact with soil placed in the container;
   wherein the sheet comprises a side wall panel having a top edge and an opposite bottom edge, the side wall panel forming the side wall of the container when the sheet is wrapped about the axis, the plurality of bottom panels being integrally formed with the side wall panel and extending from the bottom edge thereof, wherein each of the bottom panels has a proximal end integrally connected to the bottom edge of the side wall panel, an opposite distal end that defines a free edge, and a pair of opposite side edges extending between the proximal and distal ends, wherein each of the bottom panels is folded inwardly about a fold line defined at a juncture between the proximal end of the bottom panel and the bottom edge of the side wall panel,
   the bottom panels being positioned with respect to one another such that the bottom wall of the container has a recessed configuration and being secured to one another in said recessed configuration, a center of the bottom wall thus being at a higher vertical level than the juncture between the side wall panel and the bottom panels, and wherein each of the bottom panels has a length from the proximal end to the distal end that is less than a radius of the bottom wall of the container, such that a central hole is defined in the bottom wall, the central hole being delimited by the distal ends of the bottom panels.

2. The paper-based plant pot of claim 1, wherein an outer surface of the container is formed by the other major surface of the paperboard substrate, which is free of any polymer layer.

3. The paper-based plant pot of claim 2, wherein the opposite edge portions of the sheet form a lap joint therebetween and are secured together by heat sealing of the thermoplastic polymer layer on one of the edge portions to the paperboard substrate of the other edge portion, and wherein each pair of adjacent bottom panels form a lap joint therebetween and are secured together by heat sealing of the thermoplastic polymer layer on one of the bottom panels to the paperboard substrate of the other bottom panel.

4. The paper-based plant pot of claim 1, wherein the sheet further comprises an antifungal material for resisting formation of fungus on the sheet.

5. The paper-based plant pot of claim 1, wherein the thermoplastic polymer layer is formed of polyolefin containing a biodegradation-enhancing additive.

6. The paper-based plant pot of claim 1, wherein the paperboard substrate comprises recycled papermaking fibers.

7. The paper-based plant pot of claim 1, wherein the side edges of adjacent ones of the bottom panels are spaced apart when the sheet is flat prior to wrapping about the axis, and overlap each other when the sheet is wrapped about the axis and the bottom panels are folded inwardly.

8. The paper-based plant pot of claim 7, wherein the container defines a plurality of spaced-apart holes located at a juncture between the side wall and the bottom wall.

9. The paper-based plant pot of claim 8, wherein each of the plurality of spaced-apart holes is partly defined in the side wall panel and partly defined in two adjacent ones of the bottom panels.

* * * * *